United States Patent [19]
Crooks

[11] 3,963,861
[45] June 15, 1976

[54] DISC RECORD GROOVE SKIPPER APPARATUS

[75] Inventor: Horatio Nelson Crooks, Princeton, N.J.

[73] Assignee: RCA Corporation, New York, N.Y.

[22] Filed: Nov. 12, 1974

[21] Appl. No.: 522,818

[52] U.S. Cl. .................... 178/6.6 R; 178/6.6 FS; 178/6.6 DD; 178/6.6 P; 179/100.1 B; 179/100.4 D; 274/23 A; 360/10
[51] Int. Cl.² ........................................ H04N 5/76
[58] Field of Search ............. 179/100.3 V, 100.4 D, 179/100.41 G, 100.41 P, 100.4 M; 178/6.6 A, 6.6 R, 6.6 DD, 6.6 P, 6.6 FS; 360/103, 78, 86, 97, 99, 106, 10; 274/23 R, 23 A

[56] References Cited
UNITED STATES PATENTS

| 3,530,258 | 9/1970 | Gregg | 179/100.3 V |
| 3,530,447 | 9/1970 | Lambert | 179/100.4 D |
| 3,706,861 | 12/1972 | Giel | 360/103 |
| 3,715,524 | 2/1973 | Adler | 179/100.3 V |
| 3,767,848 | 10/1973 | Schuller | 178/6.6 R |
| 3,872,240 | 3/1975 | Carlson | 179/100.41 G |
| 3,872,265 | 3/1975 | Hilliker | 179/100.4 M |

OTHER PUBLICATIONS

"Control Mechanisms in the Philips VLP' Record Player"; by Janssen et al., Philips Tech. Rev. 33, pp. 190–193, 1973, No. 7.

Primary Examiner—Raymond F. Cardillo, Jr.
Assistant Examiner—Alan Faber
Attorney, Agent, or Firm—Eugene M. Whitacre; William H. Meagher; Dilip A. Kulkarni

[57] ABSTRACT

A bimorph element is interposed between a supporting structure of a video disc player and a support member. A replaceable pickup arm unit carrying a signal pickup which is subject to engagement with a spirally grooved video disc record is releasably secured to the support member. The bimorph element selectively deflects the support member in a manner that displaces the groove-riding signal pickup radially of the disc record.

8 Claims, 4 Drawing Figures

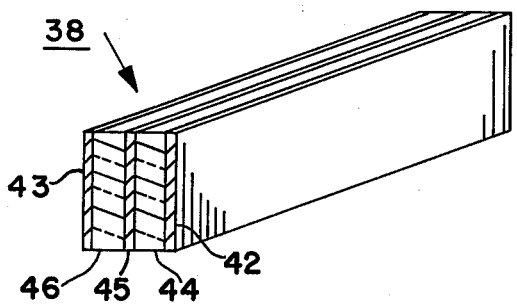
FIGURE 3
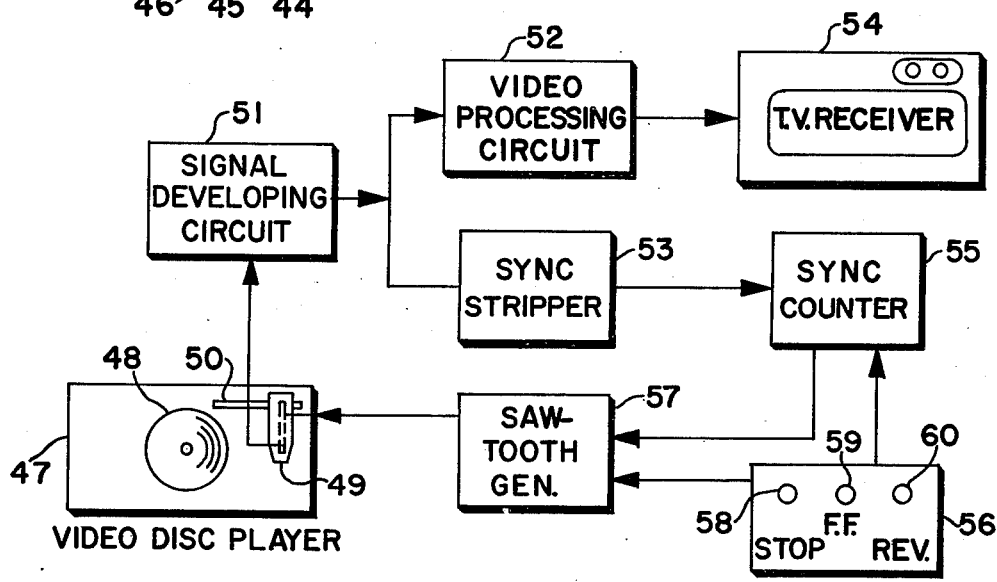
FIGURE 4
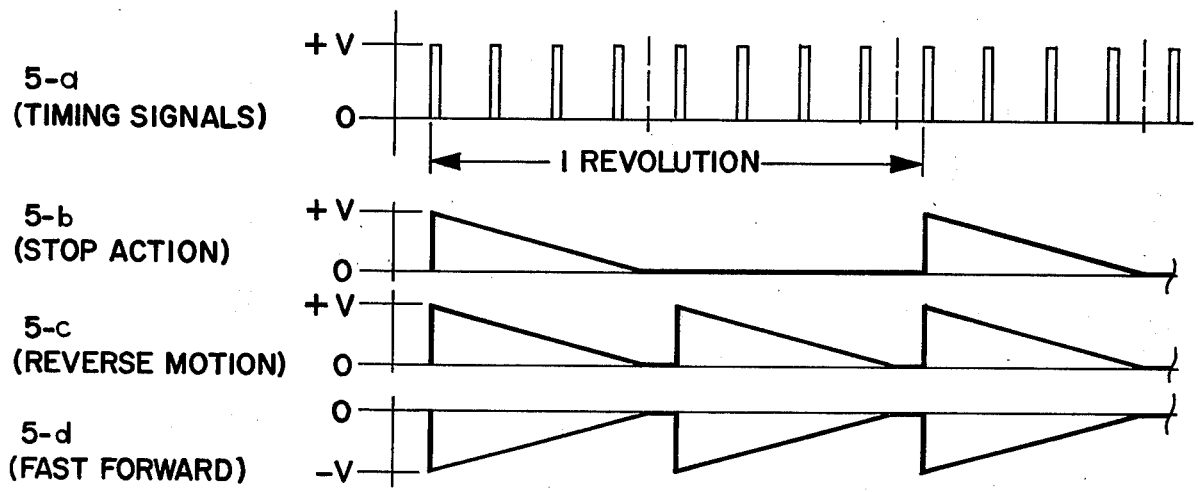

DISC RECORD GROOVE SKIPPER APPARATUS

The present invention relates generally to a novel groove skipper apparatus for repositioning a groove-engaging signal pickup radially of a spirally grooved disc record. More particularly, the present invention relates to a novel groove skipper apparatus compatible with mechanical and electrical requirements of a video disc player of the type wherein, (1) the pickup arm and the signal pickup form a replaceable unit of a size convenient to handle, (2) the pickup arm is subject to arcuate motion in order to accommodate motion of the groove-riding signal pickup, and (3) the pickup arm may also serve an electrical function (e.g., as an inner conductor of an electrical transmission line).

BACKGROUND OF THE INVENTION

In certain video disc systems, video information is recorded by means of geometric variations in the bottom of a smooth spiral groove on the surface of a disc record. The disc record surface includes a coating of conductive material which is preferably covered with a thin deposit of dielectric material. A signal pickup, supported at one end of a pickup arm, engages the spiral groove and includes a conductive electrode which establishes a capacitance with the conductive coating and the dielectric deposit of the disc record. When the disc record is rotated, the electrode-disc capacitance varies in response to the geometric variations in the bottom of the spiral groove. The capacitance variations are converted to electrical signal variations by suitable signal processing circuitry coupled to the pickup electrode. The output signal of the signal processing circuitry may be coupled to a conventional television receiver for reproduction. The other end of the pickup arm is releasably secured to a support member of a supporting structure of the playback system. A system of the aforementioned type is described in detail in U.S. Pat. No. 3,842,194, issued to J. K. Clemens on Oct. 15, 1974.

Video disc systems of the aforementioned type generally utilize disc records having groove densities in the order of four to eight thousand groove convolutions per inch. A typical video disc record of this type may have a groove convolution spacing in the order of 3.5 microns. The fragile walls of relatively narrow grooves of the disc record cannot be dependably relied upon to pull the weight of the pickup arm assembly, around the pickup arm pivot support, across the entire recorded surface of the disc record. Also in video disc systems utilizing variable capacitor concept, it is desirable for accurate reproduction of the prerecorded signals that the signal pickup electrode maintain a substantially constant attitude in the spiral groove. Therefore, the supporting structure includes a radial feed drive mechanism for traversing the supported end of the pickup arm in proper time relationship with the radial motion of the signal pickup tip engaged in the spiral groove so as to continuously maintain the longitudinal axis of the pickup arm substantially tangential to the spiral groove at the point of engagement. Reference may be made to the copending U.S. Application of F. R. Stave, Ser. No. 351,600, filed April 16, 1973, and entitled "VIDEO DISC PLAYBACK APPARATUS", now U.S. Pat. No. 3,870,835, for an illustration of a suitable radial feed drive mechanism for providing the indicated radial motion.

Further, in the above-mentioned type video disc systems it has been recognized that the relative motion between the disc record and the signal pickup should be maintained at a predetermined speed, and within specified tolerance limits (e.g., 450 rpm, ±0.01 percent), in order to obtain high fidelity of reproduction of the prerecorded signals. The predetermined speed and the specified tolerance limits are also necessary to assure that the horizontal and vertical synchronizing information is stable and within the lockup range of the deflection circuits of the television receiver. Moreover, when the prerecorded information is a color television signal with chrominance information recorded as a modulated carrier signal, the recovered signal must be stable and within the lockup range of the color processing circuits of the playback system in order to reduce color phase distortion.

The disc record/signal pickup relative speed may be maintained at the predetermined speed, and within the specified tolerance limits by rendering the pickup arm support member subject to cyclical, translatory motion along the longitudinal axis of the pickup arm in a manner that opposes deviations of the instantaneous relative speed from the predetermined speed. Illustratively, the means for imparting translatory motion to the support member may be of the type disclosed in the U.S. Pat. No. 3,711,641, issued to R. C. Palmer on Jan. 16, 1973, entitled "VELOCITY ADJUSTING SYSTEM".

Additionally, in advantageous pickup arrangements for video disc systems of the aforementioned type, the pickup arm is desirably of conductive material and enclosed in a conductive cage, so that the conductive pickup arm and the surrounding conductive cage may serve respectively as an inner and outer conductor of an electrical transmission line. The transmission line is capacity end loaded at the pickup arm supported end by a series combination of capacitances which include an air dielectric capacitor and a voltage variable capacitor (forr tuning purposes). The transmission line is also capacitor end loaded at the signal pickup end by a combination of capacitances which include the signal pickup electrode/disc record conductive coating variable capacitance. The transmission line and associated capacitances form a tuned circuit with a resonant frequency subject to variation as the signal pickup electrode/disc conductive coating capacitance varies. The tuned circuit is excited with UHF oscillations from a fixed frequency oscillator of the signal processing circuitry operating at a frequency (e.g., 915 MHz) within an ISM-allocated band. As the resonant frequency of the tuned circuit varies, the resultant UHF oscillation amplitude variations are detected by the signal processing circuitry detector to recover the prerecorded information. Reference may be made to the copending U.S. Application of D. J. Carlson, et al., Ser. No. 451,103, filed Mar. 14, 1974, and entitled "PICKUP APPARATUS FOR VIDEO DISC PLAYERS", now U.S. Pat. No. 3,872,240, for an illustration of a suitable transmission line resonant circuit arrangement and associated signal processing circuitry.

Further, in the aforementioned type video disc systems, the pickup arm and the signal pickup may desirably be treated as a replaceable unit of a size convenient to handle, whereby when the signal pickup wear calls for a replacement, the disc record player user may readily remove and replace the pickup arm/signal pickup unit without requirements for mechanical skill and manual dexterity. A replaceable unit arrangement of the aforesaid type may be desirable for several reasons. First, the replacement of the pickup arm/signal pickup unit would require no electrical wiring disconnections and connections between the signal pickup electrode and the conductive pickup arm. Second, achievement of a proper attitude for the signal pickup in its playing position may readily be established, and not left to dependence on the skill and knowledge of the user during replacement. Third, the replacement of the fragile and miniature signal pickup (e.g., the signal pickup width 2 microns, the signal pickup depth 5 microns, and the signal pickup electrode depth 0.2 microns) would be rendered practical. Reference may be made to the copending U.S. Application of M. A. Leedom, Ser. No. 522,815, filed concurrently herewith, and entitled "PICKUP ARM CARTRIDGE", for an illustration of a suitable replaceable unit.

It may be noted that the disc records having high groove densities (e.g., 4,000 to 8,000 grooves per inch) and subject to occasional flaws causing premature termination of the spiral groove. Such premature termination (commonly referred to as a "locked groove") may result in an undesired repetition of a particular groove convolution during disc record playback. It is therefore desirable to incorporate in a video disc player an apparatus suitable for relieving signal pickup from the locked groove predicament.

In certain particular applications of a video disc record system, it may be desirable to provide stop action of the displayed image. That is, to repetitively provide output signals of basically the same displayed image on an associated television monitor. Such image stop action may be desirable for allowing a viewer to observe a particular image for relatively long lengths of time. Also, in data storage systems where it may be desirable to store frames of textbook type material, the ability to linger on a particular displayed image is of special importance.

A further desirable feature for incorporation with a video disc player is the ability to provide rapid forward motion or reverse motion of the displayed image. A rapid forward function is particularly useful for quickly scanning information recorded on the video disc record. A reverse motion function may also be utilized for aiding in data retrieval and is particularly useful as a teaching aid for reviewing an instructional picture sequence recorded on the disc.

In a copending application of M. A. Leedom et al., Ser. No. 499,557, filed Aug. 22, 1974, entitled "DISC RECORD GROOVE SKIPPER", and assigned to the present assignee, an arrangement for repositioning a signal pickup from one convolution to another of a spirally grooved disc record is described. In the arrangement of said Leedom et al. application, a bimorph element is interposed between a pickup arm and a signal pickup. A pair of wires are provided for electrically connecting the bimorph element to means for generating bimorph element energizing control signals.

The present invention is concerned with a modification of the disc record groove skipper of the general form described in the aforesaid Leedom et al. application to provide a groove skipper apparatus of a modified form which may, (1) permit ready disassembly and assembly of the replaceable pickup arm unit without need for any electrical wiring disconnections and connections between the bimorph element and the control signal generating means, (2) reduce cost of replacement of the pickup arm unit by avoiding the unnecessary replacement of the bimorph element each time the pickup arm unit is replaced, (3) improve compliance of the pickup arm unit, to the arcuate motion of the pickup arm caused by the groove-riding signal pickup, by eliminating the arcuate motion of the fly leads (wires) connecting the bimorph element to the control signal generating means, and (4) reduce possible electrical interference with the playback system signal processing circuitry by remotely locating the bimorph element (and the associated wire connections) relative to the pickup-electrode/disc-record-conductive-coating signal capacitance and associated pickup circuit elements.

SUMMARY OF THE INVENTION

A replaceable pickup arm unit comprises, (1) a signal pickup subject to engagement with a spirally grooved disc record, and (2) a pickup arm carrying the signal pickup. Means for providing selective radial displacement of the groove-riding signal pickup comprise, (1) a support member for releasably securing the pickup arm end remote from the signal pickup, (2) a bimorph element interposed between the support member and a supporting structure of the player, wherein the supporting structure is not subject to arcuate motion of the pickup arm caused by the groove-riding signal pickup, and wherein the bimorph element responsive to control signals deflects the support member so as to result in displacement of the signal pickup, (3) means for generating the control signals, and (4) means for electrically connecting the control signal generating means to the bimorph element.

BRIEF DESCRIPTION OF THE DRAWINGS

Other objects, features, and advantages of the present invention will be more fully understood from the following detailed description of the preferred embodiment, the appended claims, and the accompanying drawings in which:

FIG. 3 is an exaggerated perspective drawing of a bimorph element of a piezoelectric type suitable for use with the arrangement of FIGS. 1 and 2;

FIG. 4 is a block diagram of video disc system circuitry suitable for use with the arrangement of FIGS. 1 and 2;

FIG. 5a illustrates signals which may be utilized for timing the bimorph element selective energization; and FIGS. 5b–5d illustrate control signals which may be utilized for producing respectively stop action, reverse, and fast forward motion of the signal pickup.

DETAILED DESCRIPTION OF THE PREFERRED EMBODIMENT

Figure 1:
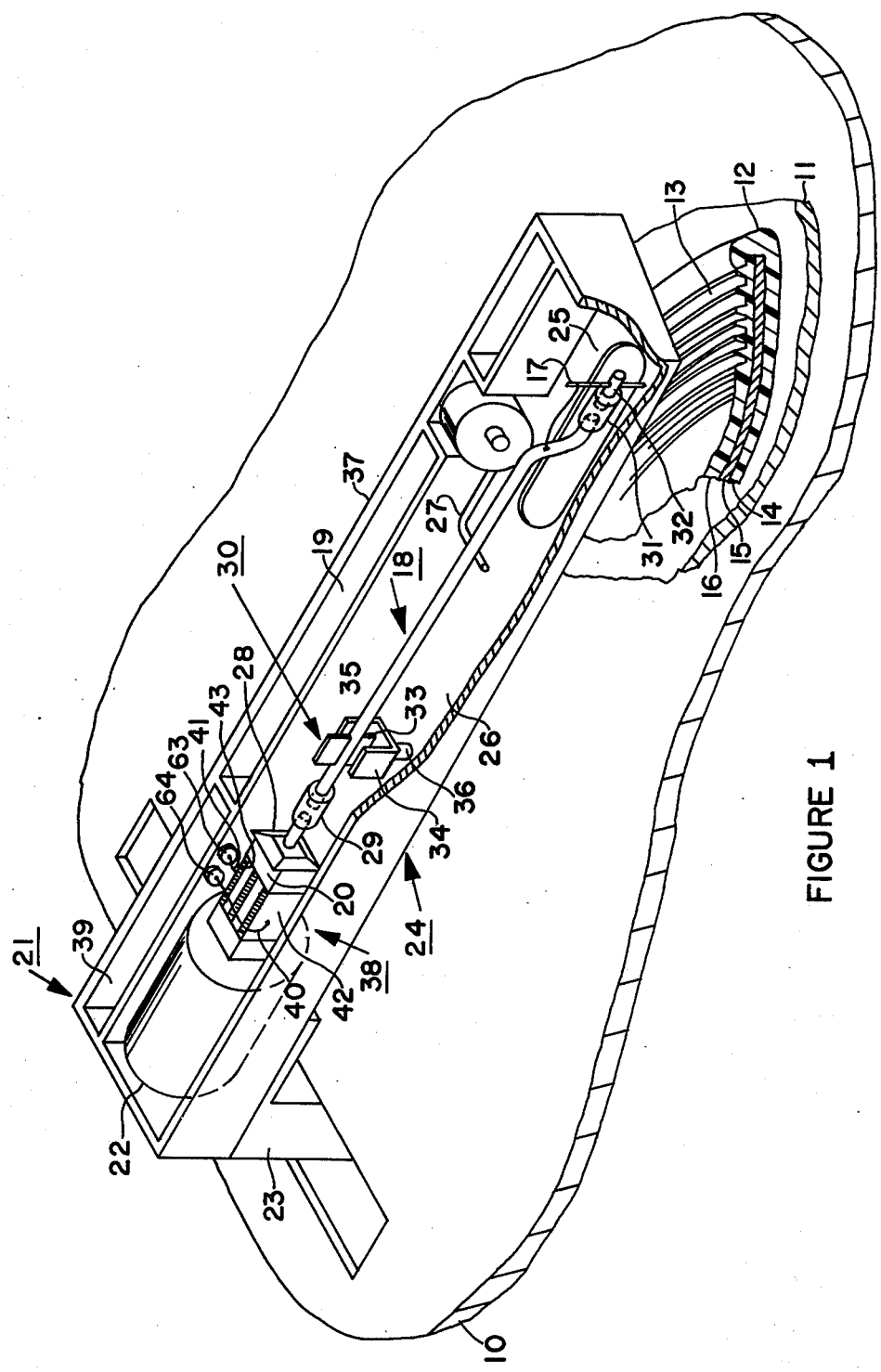
FIG. 1 is a partially cut-away view of a video disc record system incorporating a preferred embodiment of a disc record groove skipper apparatus pursuant to the principles of the present invention.
Figure 2:
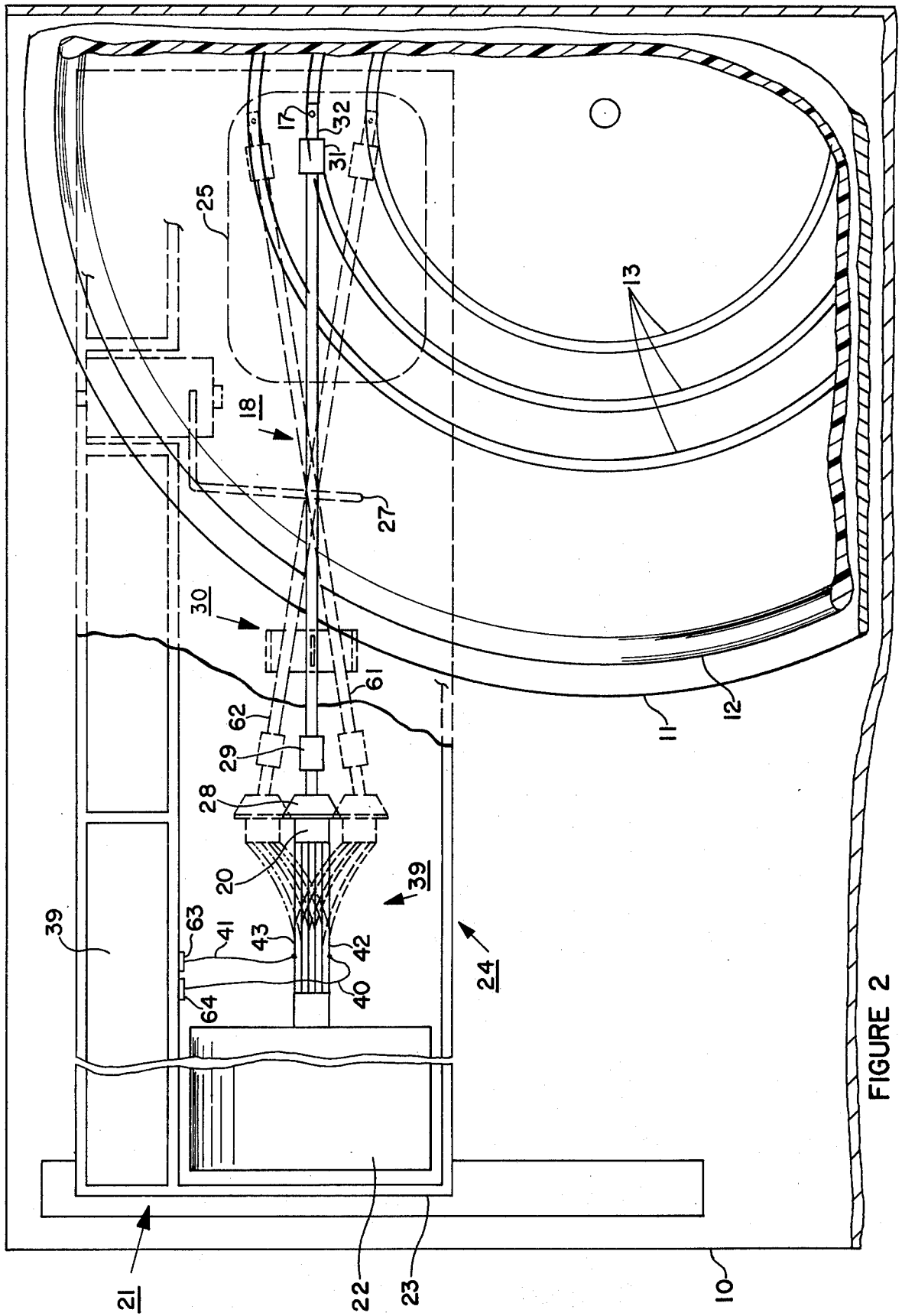
FIG. 2 is an exaggerated top view of a portion of the video disc record system of FIG. 1, diagrammatically illustrating groove-skipping displacement of a pickup arm carrying a groove-riding signal pickup, a portion of a conductive cage surrounding the pickup arm being removed to illustrate the details.

Referring to the drawings, wherein like reference numerals designate similar elements in the various views, in FIGS. 1 and 2 a video disc player is shown having a turntable mounting plate 10. The player is suitable for use in a video disc system such as disclosed in the aforementioned Clemens patent. A turntable 11 is rotatably mounted on the turntable mounting plate 10. The upper surface of the turntable 11 is adapted to support a video disc record 12. Video information is recored by means of geometrical variations in the bottom of a smooth spiral groove 13 on the substrate 14 of the disc record 12. The disc record 12 surface includes a conductive coating 15 which is preferably covered with a thin deposit 16 of dielectric material. Although the disc record 12 is shown to have recording on one side only for the purposes of simplicity, it will be seen that the disc record may as well have recording on both sides. A signal pickup 17, supported by a conductive pickup arm 18, engages the spiral groove 13 and includes a conductive electrode (not shown) which, together with the conductive coating 15 and the dielectric deposit 16, form a capacitor. When relative motion is established between the signal pickup 17 and the disc record 12, an edge of the electrode included in the signal pickup, while riding in the spiral groove 13, serves as an electrode of a capacitor varying due to the geometric variations in the bottom of a smooth spiral passing underneath. The other end of the pickup arm 18 is releasably secured to a support member 20 carried by a pickup arm supporting structure 21, in the manner to be also described subsequently.

The pickup arm supporting structure 21 comprises a radial feed drive mechanism 23 and a translatory motion imparting means 22. As indicated before, the radial feed drive mechanism 23 traverses the pickup arm support 20 in proper time relationship with the radial motion of the signal pickup 17 tip engaged in the spiral groove 13 so as to continuously maintain the longitudinal axis of the pickup arm substantially tangential to the spiral groove at the point of engagement. Reference may be made to the aforementioned copending Stave application (Ser. No. 351,600) for an illustration of a suitable feed drive mechanism for providing the indicated radial motion.

As noted above, the translatory motion imparting means (also known as "armstretcher") varies the position of the signal pickup 17 along the disc record spiral groove 13 by imparting cyclical, translatory motion to the pickup arm along its longitudinal axis, via the support member 20, in a manner that opposes deviations of instantaneous relative speed from a predetermined speed. Illustratively, the translatory motion imparting means may be of the abovementioned Palmer type (U.S. Pat. No. 3,711,641).

A box-like, conductive cage 24 (shown with its lid removed for clarity) is mounted to the supporting structure 21 for enclosing the conductive pickup arm 18. During playback, the pickup arm 18 passes through an opening 25 in the bottom wall 26 of the housing for permitting the signal pickup 17 to ride in the spiral groove 13. A pivotally mounted bracket 27 lifts the free end of the pickup arm 18 to disengage the signal pickup 17 from the spiral groove 13, when the player is inoperative.

Illustratively, the replaceable pickup arm unit may comprise a signal pickup holder 32 (carrying the signal pickup 17) pivoted by a compliant signal pickup holder support 31 to the pickup arm 18 free end. The compliant signal pickup holder support rigidly transmits the cyclical, translatory motion of the pickup arm 18 to the signal pickup holder 32, while accommodating vertical and lateral, arcuate motion of the signal pickup 17 in the spiral groove. The compliant holder support 31, being located adjacent to the signal pickup 17, reduces the pickup arm unit mass which must follow the arcuate motion of the signal pickup, whereby the pickup arm unit compliance is enhanced.

A coupler 28 is secured to the pickup arm 18 end, remote from the signal pickup 17, by a compliant pickup arm support 29. The coupler 28 is releasably coupled to the support member 20. The compliant pickup arm support 29 also rigidly transmits the cyclical, translatory motion of the coupler 28 to the pickup arm 18 while decoupling the coupler (subject to engagement with the support member 20) from arcuate motion of the pickup arm. Reference may be made to the copending U.S. Application of B. K. Taylor, Ser. No. 522,822, filed concurrently herewith, and entitled "DETACHABLE PICKUP ARM MAGNETIC COUPLER", for an illustration of a releasable coupling between the coupler 28 and the support member 20.

An end of the conductive pickup arm, remote from the pickup arm support 29, is connected to the signal pickup electrode by any suitable means. In the illustration, respective ends of a lead are soldered to the conductive pickup arm 18 remote end and the signal pickup 17 electrode. The conductive first end portion and the surrounding conductive cage serve respectively as an inner and outer conductor of a transmission line. The transmission line is capacity end loaded at both ends: (1) at the signal pickup 17 end by a variable capacitance corresponding to the series combination comprising (a) the varying capacitance established between the signal pickup electrode and the disc record conductive coating 15, and (b) the larger capacitance exhibited between the bottom of the conductive cage 24 and the disc record conductive coating overshadowed by the cage; and (2) at the pickup arm support 20 end by the series combination including (a) an air dielectric capacitor 30, and (b) a voltage variable capacitor (not shown).

The air dielectric capacitor 30 includes a movable capacitor plate 33, suspended from the pickup arm 18, received in an air gap between a pair of fixed capacitor plates (34 and 35) fixedly mounted to the conductive cage bottom surface 26 by an insulator 36.

The transmission line and the associated capacitances establish a tuned circuit with resonant frequency subject to variation as the signal pickup electrode/disc record conductive coating capacitance varies. The tuned circuit is excited with UHF oscillations from a fixed frequency oscillator (not shown) of the signal processing circuit 19 enclosed in a cage compartment 37 operating at a frequency (e.g., 915 MHz) within an ISM-allocated band. As the resonant frequency of the tuned circuit varies, the resultant amplitude variations are detected by the signal processing circuitry 19 detector to recover the prerecorded information. Reference may be made to the aforementioned, copending Carlson application (U.S. Pat. No. 3,872,240) for an illustration of a suitable transmission line circuit arrangement and associated signal processing circuitry.

A bimorph element 38 is provided having a first end fixedly secured to (a) the support member 20, and a second end fixedly secured to (b) the translatory motion imparting means 22 of the supporting structure 21 (which is not subject to the pickup arm 18 arcuate motion). The bimorph element 38 may comprise a suitable transducer: e.g., magnetostrictive, electromagnetic, piezoelectric, etc. Illustratively, in the preferred embodiment, the bimorph element 38 comprises a piezoelectric structure. As more clearly shown in FIG. 2, the bimorph element 38 in response to control signals (of the type, for example, illustrated in FIGS. 5b–5d) deflects the support member 20 secured to the bimorph element first end (in relation to the second end) so as to cause radial displacement of the signal pickup 17. In one application of disc record groove skipper apparatus of the above-mentioned form to use with a pickup arm unit having specific mass, stiffness, and damping characteristics, it was found that the pickup arm 18 was caused to rotate around its center of mass when the bimorph element 38 was pulsed. In other words, the pickup arm 18 supported end and the signal pickup end move in opposite directions. Such action is illustrated in FIG. 2. In other applications of the invention to use with pickup arm units with different values for mass, stiffness and damping characteristics, the pickup arm was caused to rotate about the bimorph element as its center of rotation, i.e., in these instances, the supported end and the signal pickup end of the pickup arm 18 move in the same direction. The control pulse poling for a particular direction of groove skipping is thus to be chosen with appropriate consideration of pickup arm parameters.

Means 39 are provided for generating the control signals (e.g., (2the type illustrated in FIGS. 5b–5d) for selectively energizing the bimorph element 38. Means (40 and 41) mounted on the supporting structure 21 are employed for electrically coupling the control signal generating means 38 to the bimorph element in a manner that does not hinder, (a) the pickup arm 18 arcuate motion during playback, and (b) the replacement of the pickup arm unit when wear of the signal pickup calls for a replacement. Suitable means may be used for electrically coupling the control signals to the bimorph element. For example, a pair of conductive wires 40 and 41 are provided with their ends fixedly connected respectively (1) to terminals (63 and 64) of the control signal generating means 39, and (2) to metal electrodes (42 and 43) affixed on each side of the piezoelectric structure 38.

As illustrated in FIG. 3, the piezoelectric structure 38, utilized in the preferred embodiment, is comprised of an alternating series of layers of metal and piezoelectric material. A first metal layer 42 is followed by (1) a piezoelectric layer 44, (2) a second metal layer 45, (3) a second piezoelectric layer 46, and (4) a final layer of metal 43, in that order. By arranging the piezoelectric material 44 and 46 in the configuration shown in FIG. 3, a bimorph element 38 may be realized. A bimorph (or bending mode) element 38 is made from the structure illustrated in FIG. 3 by properly polarizing the piezoelectric layers 44 and 46. The layers 44 and 46 are polarized by first applying an electrical potential of the same polarity to the metal layers 42 and 43 with a common electrical return connection to the metal layer 45. The piezoelectric and metal structure is thereafter placed in an environment of elevated temperature. The particular temperature required to make the structure bimorph is the Curie Temperature of the piezoelectric material. When the piezoelectric structure is properly cooled, the piezoelectric layers become polarized and the potentials applied to the metal layers 42, 45 and 43 are removed. The resultant polarization is such that the layer 44 is of the opposite polarity from that of the layer 46 with respect to the outer metal layers 42 and 43. Thereafter, by applying an appropriate potential across the metal layers 42 and 43, one of the piezoelectric layers will contract and the other expand causing the entire piezoelectric structure to bend in a direction dictated by the polarity of the applied potential. By applying a particular potential of given polarity across the metal layers 42 and 43, a bending motion of the bimorph element 38 is implemented as illustrated in FIG. 2.

In order to effectively control the bending motion of bimorph element 38, the apparatus illustrated in FIG. 4 is utilized. FIG. 4 illustrates a video disc player 47 including a turntable upon which a prerecorded video disc record 48 is rotated. An arm cage 49 encloses the pickup arm unit illustrated in FIGS. 1 and 2 and is arranged to be positioned over the video disc record 48 by sliding along a slot 50. Capacitance variations between the disc record 48 conductive coating and the signal pickup 17 electrode are coupled to a signal developing circuit 51 wherein decoding occurs and a composite video signal developed. The signals developed by the signal developing circuit 51 are coupled to a video processing circuit 52 and a sync stripper 53. The video processing circuit 52 rearranges the luminance and chrominance constituents of the video signal into a format (such as, NTSC format) suitable for decoding by television receiver 54. Video signals rearranged by processing circuit 52 are coupled to a television receiver 54 where they may be displayed on an associated image display device. Sync signals provided by the sync stripper 53 are coupled to a sync counter 55. The sync counter 55 in response to signals from a control unit 56 provides an output signal which repetitiously occurs at a predetermined whole number division of the frequency of the applied vertical sync signals. A sawtooth generator 57 receives signals from both the sync counter 55 and the control circuit 56 and responsively provides sawtooth control signals. These sawtooth control signals are coupled to the bimorph element 38 through the wires 40 and 41 (see FIGS. 1 and 2) and operate to control the bending motion of the bimorph element.

In the operation of the above-described circuitry, a displayed image may be caused to effectively stop, move rapidly forward or move in a reverse action. To provide stop action playing from a video disc record, it is necessary to repetitively play the information played for previous television frame. A simulated stop action can also be had by replaying several frames repeatedly. In one particular type of video disc recording, four television frames are recorded in each convolution of a video disc record. To provide an effective stop action of the image reproduced with this type of video disc recording, the signal pickup 17 may be repeatedly repositioned in an adjacent outer convolution of the disc after the completion of each disc record revolution. In other words, four frames of video information may be continuously repeated by causing the signal pickup 17 to skip to an adjacent outer convolution at the same position on the record once each revolution.

Fast forward play of the video disc record may be implemented by causing the signal pickup 17 to skip to an adjacent inner convolution (toward the center of the disc record) at particular portions of the convolution in which it is riding. For example, the signal pickup 17 may be made to skip to an adjacent inner groove convolution once each ½ revolution of the video disc record. By changing groove convolutions once eacn ½ revolution of record play, two frames will be sensed in the forward direction, four frames will be skipped in the forward direction, then two frames will be sensed in the forward direction, and so on. The resultant image produced by playing ones and skipping others of the recorded frames appears in a speed-up sequence.

Similarly, reverse motion of the displayed image can be effected by causing the signal pickup 17 to shift groove convolutions towards the outside of the disc record, for example, once each ½ revolution of the video disc record. This, in effect, causes the signal pickup 17 to slowly move towards the outside of the disc record. In other words, the video disc player 47 is caused to play two frames in the forward direction and then caused to skip back four frames and again play two more in the forward direction and so on progressing towards the beginning of the disc record.

First, now to effect stop action of the displayed image, a stop button 58 of the control unit 56 is depressed. The stop button 58 engages the divide by eight portion of sync counter 55 and further sets the polarity of the output signal provided by the sawtooth generator 57. The sync counter 55 receives vertical sync pulses from the sync stripper 53 during the vertical blanking interval of each television field. There are eight television fields per revolution of the video disc record corresponding to four television frames. Vertical timing signals corresponding to vertical sync pulses are illustrated in FIG. 5a. When eight vertical sync signals have passed into the sync counter 55, an output signal is developed and applied to the sawtooth generator 57. The sawtooth generator 57 generates a sawtooth control signal (see FIG. 5b) having a relatively sharp rise time corresponding to the initiation of the input signal provided by the sync counter 55. The relatively sharp rise in voltage (exaggerated in the graphs of FIG. 5) causes the bimorph element 38 secured to the supporting structure 21 to rapidly twitch, moving the signal pickup 17 to an adjacent groove convolution towards the outside of the video disc record (as shown by a pickup arm position 61 in FIG. 2). The amplitude of the applied sawtooth control signal thereafter diminishes towards a quiescent value allowing the pickup arm 18 to gradually move towards the new convolution position (see FIG. 2). By applying a sawtooth-shaped control signal (see FIG. 5b) to the bimorph element 38 once each revolution, particularly during the vertical blanking interval, the signal pickup 17 can be caused to continuously read-out the signal information in one particular convolution without disturbing the displayed image. A continuous read-out from one groove convolution allows a continuous play of the four frames of video information recorded in the particular convolution. Hence, if the signal information during the four frames of this one convolution is substantially the same and without motion, then a signal read-out appearing as a still image will be produced on the television monitor. If, however, the signal information during the four frames of the repeated convolution is that of an image in motion, then the repetitious playback of the four frames will show a continuous repeat of the motion occurring during the four frame interval. This type of motion display is particularly useful when instructional information is recorded on the video disc record such as, a tennis or a golf lesson, where it may be desirable to show a particular motion of, for example, a tennis or golf swing. An audio blanking system, not shown, may further be incorporated in the control unit 56 for selectively blanking the audio signal output of the television receiver 54 during such stop action fast forward or reverse motion.

Second, depression of a fast forward button 59 engages the divide by four portion of the sync counter 55 providing thereby an output signal from the counter that corresponds to each four vertical sync pulses or each half revolution of the video disc record. The sawtooth generator 57 is further engaged by the fast forward button 59 to provide control signals of opposite polarity from those utilized for either stop action or reverse motion (see FIG. 5d). Hence, upon depression of the fast forward button 59, a sawtooth control signal is generated at each ½ revolution of the video disc record during the vertical blanking interval causing the bimorph element 38 to twitch so as to displace the signal pickup 17 to an adjacent groove convolution closer to the center of the disc record (as shown by a pickup arm position 62 in FIG. 2). The forward shifting motion of the signal pickup 17 toward the center of the disc record at each half revolution of the disc record causes the signal pickup 17 to sense groups of four frames skipping two frames in between. This skipping motion, as mentioned above, effects a fast forward motion of the displayed image.

Third, reverse motion may be effected in a similar manner by depressing a reverse motion button 60. Depression of the reverse button 60 causes the sync counter 55 to operate in a divide by four mode as was done for the fast forward motion. The sawtooth generator 57 is further caused to provide a sawtooth pulse having the same polarity as that provided for stop motion (see FIG. 5c). When the reverse motion button 60 is engaged, a series of sawtooth control signals are generated causing the bimorph element 38 to twitch so as to successively reposition the signal pickup 17 into adjacent outer groove convolutions (as shown by the pickup arm position 61 in FIG. 2). Each sawtooth control signal is developed after ½ revolution of the disc record. This results in playback of pairs of television frames wherein two frames are played followed by two frames immediately preceding the two frames just played, and so on. Video playback in such a sequence results in a reverse motion of the displayed image.

Fourth, a further application of the disc record groove skipper apparatus is in the removal of the signal pickup from a locked groove. A locked groove, as described earlier, is one which causes the signal pickup 17 to repetitively play the same groove convolution when not desired. When a locked groove exists due to a flaw in the disc record, it may be desirable to reposition the signal pickup 17 out of such locked groove and into the next adjacent groove convolution. Removal of the signal pickup 17 from a locked groove may be facilitated by momentarily engaging the fast forward button 59 and thereby causing the signal pickup to be repositioned in a groove convolution closer to the center of the disc record. In the alternative, a system for sensing the presence of a locked groove may be incorporated in the control signal generating means 39 with the subject groove skipper apparatus for automatically repositioning the signal pickup out of a locked groove. Reference may be made to the copending application of Thomas Burrus, concurrently filed herewith Ser. No. 522,817, and entitled "LOCKED GROOVE DETECTION AND CORRECTION IN VIDEO DISC PLAYBACK APPARATUS", for an illustration of a suitable locked groove sensing system, and control signal generating circuit responsive thereto. The aforesaid Burrus application also provides a more detailed consideration of control signal waveshape appropriate for operation of the groove skipper apparatus of the present invention.

For the purposes of the locked groove relief application, the axis of the bimorph element may be cambered at an angle to the disc record surface so as to assure that the deflection of the bimorph element is only effective in causing radially inward displacement of the signal pickup.

In one particular application of the groove skipper apparatus, the bimorph element 38 was approximately 25 mils on each side and ¾ of an inch long. The bimorph element was constructed of PZT-5 and obtained as a completed unit from the Cleveite Corporation, Bedford, O. A 100 volt peak-to-peak sawtooth waveform was utilized to provide a stylus movement in the order of approximately 5 mils.

Although the subject apparatus has been described with a capacity sensing stylus, other types of signal pickup devices such as those incorporating piezoelectric material may also be utilized.

Thus, the disc record groove skipper apparatus of the present invention has the following features. First, the apparatus permits ready disassembly and assembly of the replaceable pickup arm unit without need for any electrical disconnections or connections between the bimorph element and the control signal generating means during replacement. Second, the apparatus reduces the cost of replacement of the pickup arm unit by avoiding the unnecessary replacement of the bimorph element each time the pickup arm unit is replaced. Third, the apparatus enhances the compliance of the pickup arm unit (to the arcuate motion of the pickup arm caused by the groove-riding signal pickup) by eliminating the arcuate motion of the fly leads connecting the bimorph element to the control signal generating means. Fourth, the apparatus reduces electrical interference with the playback system signal processing circuitry by remotely locating the bimorph element (and the associated wire connections) relative to the pickup-electrode/disc-record-conductive-coating signal capacitance and associated pickup circuits.

What is claimed is:

1. In a playback system for recovering prerecorded information encoded in successive convolutions of a continuous spiral groove disposed on the surface of a rotatable disc record, said playback system including a supporting structure; a groove skipper apparatus comprising:

1. a replaceable pickup arm unit which comprises:
      A. a signal pickup having a stylus adapted for entry in the spiral groove of the rotating disc record during playback, and normally subject upon the entry to retention within the groove by the walls of the groove during the disc record rotation so that the information encoded in successive convolutions of the spiral groove is recovered in sequence by the stylus; and
      B. a pickup arm having the signal pickup fixedly secured at one end thereof;
   2. means for selectively changing the groove convolution in which the pickup stylus is retained comprising:
      A. a support member for releasably securing an end of the pickup arm remote from the signal pickup, wherein the support member permits arcuate motion of the pickup arm in order to accommodate vertical and lateral motion of the signal pickup stylus in the disc record spiral groove during playback;
      B. a bimorph element having a first end and a second end which are fixedly secured respectively to (a) the support member, and (b) the supporting structure, wherein the bimorph element is not subject to the arcuate motion of the pickup arm, and wherein the bimorph element, in response to a control signal application thereto, deflects the support member in order to change the groove convolution in which the pickup stylus is retained;
      C. means for generating the control signal; and
      D. means mounted on the supporting structure for electrically coupling the control signal generating means to the bimorph elements.

2. A system as defined in claim 1 wherein the signal pickup includes an electrode which cooperates with a conductive coating on the disc record to form a varying capacitance indicative of the prerecorded signals as the disc record is rotated during playback, wherein the pickup arm is made of conductive material having an end remote from the pickup arm supported end connected to the signal pickup electrode, wherein the conductive pickup arm is enclosed in a conductive cage, wherein the conductive pickup arm and the surrounding conductive cage serve respectively as inner and outer conductors of an electrical transmission line, wherein the transmission line and the varying capacitance establish a tuned circuit, wherein during playback the tuned circuit is excited with energizing oscillations and response thereof is detected for recovering the prerecorded signals, and wherein the location of said electrical coupling means is sufficiently remote from said transmission circuit as to substantially preclude electrical interference therewith.

3. A system as defined in claim 1 wherein the supporting structure includes means for imparting translatory motion to the pickup arm support member so as to vary the position of the signal pickup along the disc record spiral groove in a manner that reduces deviations of the relative speed from a predetermined speed.

4. A system as defined in claim 1 the bimorph element comprises a piezoelectric structure, wherein the control signal has a frequency which is related to the rotational speed of the disc record, and wherein the polarity of the control signal is determined by the desired direction of movement of the pickup stylus.

5. A system as defined in claim 4 wherein the electrical coupling means comprises a pair of conductive wires having their ends fixedly connected respectively, (1) to terminals of the control signal generating means, and (2) to metal electrodes affixed on each side of the piezoelectric structure.

6. A system as defined in claim 5 wherein the control signal generating means include a generator for providing signals having a relatively rapid amplitude increase followed by a relatively gradual amplitude decrease toward a quiescent value.

7. A system as defined in claim 6 wherein the piezoelectric structure is so constructed as to effect the radial displacement of the signal pickup, (1) away from the center of rotation of the disc record in response to the control signals of a first polarity, and (2) toward the center of rotation of the disc record in response to the control signals of a second polarity.

8. In a playback system for recovering prerecorded information encoded in successive convolutions of a continuous spiral groove disposed on the surface of a rotatable disc record, said playback system including a supporting structure; a groove skipper apparatus for preventing undesirable repetitive tracking of a locked groove convolution comprising:
1. a replaceable pickup arm unit which comprises:
  A. a signal pickup having a stylus adapted for entry in the spiral groove of the rotating disc record during playback, and normally subject upon the entry to retention within the groove by the walls of the groove during the disc record rotation so that the information encoded in successive convolutions of the spiral groove is recovered in sequence by the stylus; and
  B. a pickup arm having the signal pickup fixedly secured at one end thereof;
2. means for selectively changing the groove convolution in which the pickup stylus is locked comprising:
  A. a support member for releasably securing an end of the pickup arm remote from the signal pickup, wherein the support member permits arcuate motion of the pickup arm in order to accommodate vertical and lateral motion of the pickup stylus in the spiral groove during playback;
  B. a bimorph element mechanically interposed between the support member and the supporting structure, wherein the bimorph element is not subject to the arcuate motion of the pickup arm, and wherein the bimorph element, in response to a control signal application thereto, deflects the support member in order to change the groove convolution in which the pickup stylus is locked;
  C. means for generating the control signal in response to the occurrence of the locked groove condition, and the control signal having a polarity which causes inward movement of the pickup stylus into an adjacent groove convolution; and
  D. means mounted on the supporting structure for electrically coupling the control signal generating means to the bimorph element.

* * * * *